United States Patent [19]
Perl

[11] Patent Number: 4,716,632
[45] Date of Patent: Jan. 5, 1988

[54] PANEL MOUNTING FASTENER SYSTEM
[75] Inventor: Uwe W. Perl, Union Lake, Mich.
[73] Assignee: Voplex Corporation, Pittsford, N.Y.
[21] Appl. No.: 21,127
[22] Filed: Mar. 3, 1987
[51] Int. Cl.$^4$ .................................................. B60R 13/02
[52] U.S. Cl. ........................................ 24/289; 24/294; 24/296; 24/546
[58] Field of Search ................. 24/289, 292, 294, 293, 24/296, 453, 689, 546, 67.9; 248/217.3; 52/717

[56] References Cited
U.S. PATENT DOCUMENTS

| | | | |
|---|---|---|---|
| 1,621,720 | 3/1927 | Harper | 24/546 |
| 1,929,590 | 10/1933 | Krentler | 24/294 |
| 2,037,301 | 4/1936 | Ball | 24/296 |
| 2,123,527 | 7/1938 | Golden | 24/453 |
| 2,198,186 | 4/1940 | Tinnerman | 24/294 |
| 2,961,723 | 11/1960 | Hamman | 24/289 |
| 3,047,920 | 8/1962 | Bobrowski | 24/289 |
| 3,132,727 | 5/1964 | Meulenberg et al. | 24/296 |
| 3,251,105 | 5/1966 | La Penna | 24/296 |
| 3,254,382 | 6/1966 | Clark | 24/296 |

FOREIGN PATENT DOCUMENTS

| | | | |
|---|---|---|---|
| 0170264 | 2/1986 | European Pat. Off. | 24/289 |
| 0191851 | 9/1985 | Japan | 24/289 |

Primary Examiner—Victor N. Sakran
Attorney, Agent, or Firm—Stonebraker, Shepard & Stephens

[57] ABSTRACT

A mounting fastener 2 which includes various combinations of base plate 30, mounting bracket 4, and fastener 18 is disclosed. The mounting bracket 4 is a formed wire bracket to provide the stand-off distance between a supporting structure and a mounted panel. Mounting bracket 4 has a pair of parallel feet 6 and a pair of parallel legs 8 extending upward from these feet and a yoke 10 joining the legs in a generally transverse plane (which may or may not be parallel with the feet 6) over the feet, yoke 10 defining a collar 14 into which fastener 18 is resiliently snapped. Opposed tips 16, one extending at the end of each foot 6, adapt mounting bracket 4 for resilient snap engagement to a panel member. Bracket 4 snaps into engagement in channels 38 and tip holes 40 of the base plate 30. A simpler form of bracket 50 is adapted to hang on a supporting structure, also effecting the spacing of the mounted panel from the supporting structure. In an alternative embodiment, the base plate is of a plastic material and includes a number of raised points on its underside for joining or sonic welding of the base plate to the panel member. Its edge channels are tapered so that the fit of the feet therein is tighter toward the heels than toward the tips.

23 Claims, 11 Drawing Figures

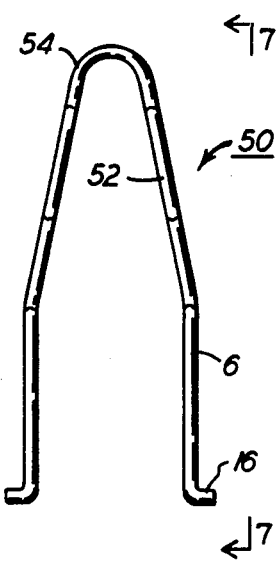
FIG. 6
FIG. 7
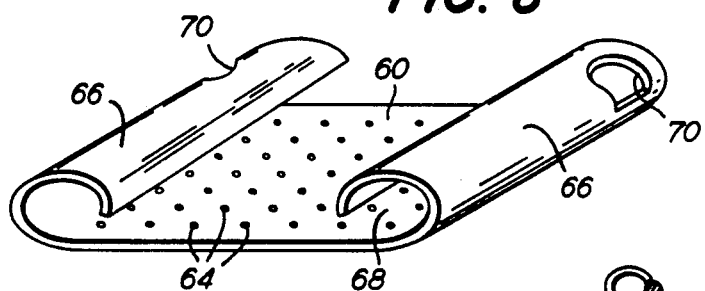
FIG. 8
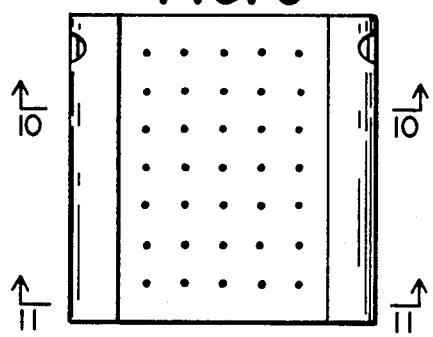
FIG. 9
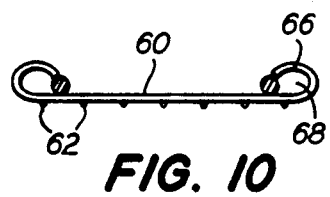
FIG. 10
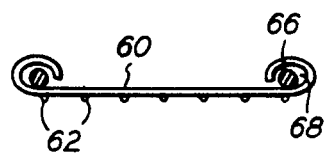
FIG. 11

4,716,632

PANEL MOUNTING FASTENER SYSTEM

BACKGROUND OF THE INVENTION

This invention relates to mounting fasteners for attachment between a supporting structure and a supported panel. More specifically, the invention relates to mounting fasteners which are also spacers for use between contoured surfaces of a supporting member and a supported panel.

One environment for the use of this invention is in automotive body paneling. Examples of the use of panel fasteners in the automotive industry are to secure door panels to the door structure or secure interior panels to the body structure. Such fasteners are attached to the backside of a panel, and they typically include caps or pins that extend through holes provided for that purpose in the sheet metal structure of the body.

The steel structural part of an automobile body is generally not flat, even in small areas. Similarly, the interior paneling mounted on the steel structure is not flat. Whenever curved or contoured surfaces are mounted with respect to each other, the spacing between them accordingly varies. Thus, the fastener systems that are used to mount a panel to a supporting structure must somehow accommodate the varying distances between panel and structure. A single size fastener will not fit all the appropriate attachment points.

SUMMARY OF THE INVENTION

It is an object of this invention to provide a simplified mounting fastener system for attachment between a supporting structure and a supported panel to accommodate a varying space between the two members.

The fastener system of this invention may be summarized as a combination of a base plate and a resilient bent wire mounting bracket for snap engagement on the base plate. One form of the base plate is preferably a substantially flat plate with stamped-out "rosette" barbs for gripping engagement with the backside of a panel. The base plate has upward inturned lateral edges into which the mounting bracket is snapped. The mounting bracket is one of a variety or family of brackets made for snap engagement with the base plate, these brackets all having in common a pair of more or less parallel feet each terminating in an outwardly extending tip for engagement under the lateral edges of the base plate. In one embodiment, the bracket also includes parallel legs extending upward from the feet, these legs being joined by a yoke forming a collar. A fastener having a flanged neck at one end is snapped into this collar, the other end of the fastener being adapted for engagement with a supporting structure.

In an alternative preferred embodiment, the base plate is of a plastic material and includes a number of raised points on its underside for joining the base plate to the panel member, preferably by sonic welding. Its edge channels are tapered so that the fit of the feet therein is tighter toward the heels than toward the tips.

DRAWINGS

FIG. 6 is a top view of another form of mounting bracket;

FIG. 7 is an edge view of the bracket of FIG. 6; and

FIGS. 8–11 are perspective, top, and sectional views respectively of another form of base plate -- FIG. 10 being a section along the line 10—10 and FIG. 11 being a section along the line 11—11 of FIG. 9.

DETAILED DESCRIPTION

Figure 1:
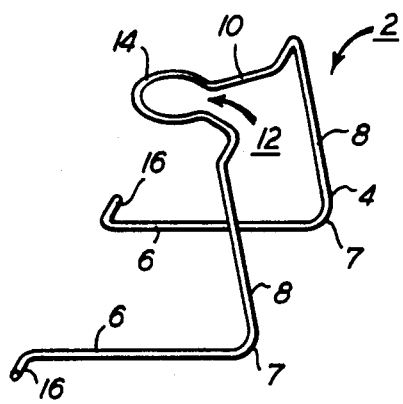
FIG. 1 is a perspective view of a mounting bracket element according to this invention.
Figure 2:
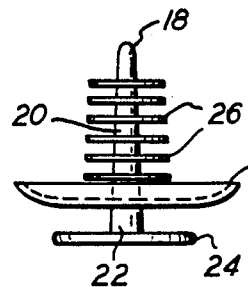
FIG. 2 is an elevation view of a fastener element.

Referring now to FIG. 1, the mounting bracket member 4 of this invention is shown in perspective view. The mounting bracket 4 includes a pair of generally parallel feet 6; a pair of generally parallel legs 8, one extending upward from each of the feet; and a yoke 10 joining the two legs 8, the yoke extending in a generally transverse plane over the feet 6. The plane of yoke 10 may or may not be parallel with the plane of the feet 6. The central portion of the yoke 10 includes a relatively narrow spring notch 12 and a relatively larger collar 14 into which a fastener such as that shown in FIG. 2 is snapped. The feet 6 are generally parallel so as to lie on base plate 30 (FIG. 3) which in turn lies on the back surface of a panel. Feet 6 terminate in oppositely extending tips 16 which are adapted to snap into engagement with mating apertures provided for the purpose on the edges of base plate 30. The mounting bracket 4 is formed of steel wire for strength and resilience, adapting it for snap engagement with base plate 30.

Figure 3:
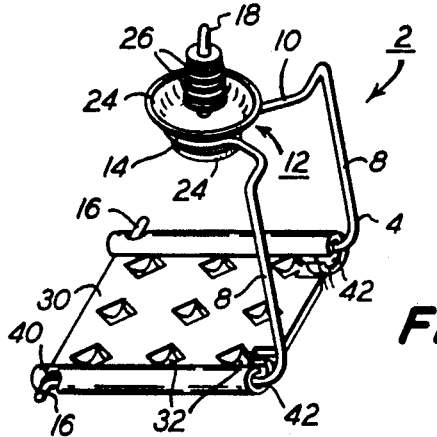
FIG. 3 is a view, from the same direction as FIG. 1, of the combined base plate, mounting bracket, and fastener assembly.

Referring now to FIG. 2, a fastener 18 of the type known as a "Christmas tree" fastener is shown. Fastener 18 includes a central elongated body 20, a neck portion 22 defined by a pair of flanges 24, and a plurality of radial disk-like elements 26 spaced along the body 20. Fastener 18 is preferably formed of a plastic material. In FIG. 3, the fastener 18 and mounting bracket 4 are shown joined by the snap-fit engagement of fastener 18 within the notch 12 and collar 14. The mounting bracket 4 is in turn snap-fit onto the base plate 30.

Figure 4:
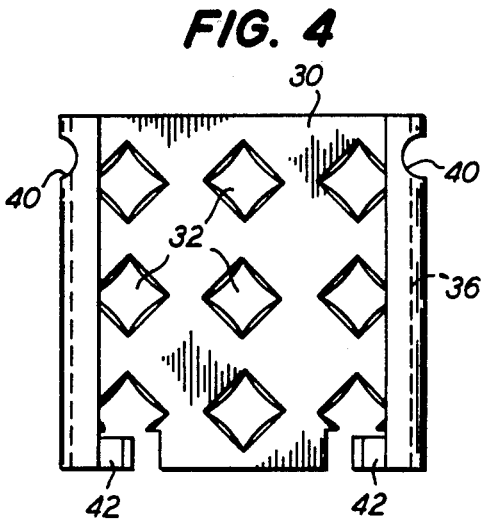
FIG. 4 is a top view of a base plate.
Figure 5:
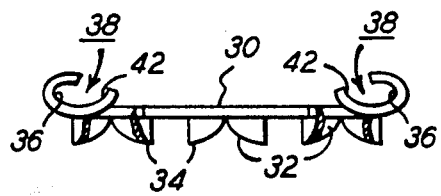
FIG. 5 is an end view of the base plate of FIG. 4.

FIGS. 4 and 5 show top and end views of base plate 30. Base plate 30 is a substantially flat metal plate having apertures 32 stamped through it, these stamped-out apertures forming barbs or "rosettes" 34 on the underside of the plate. These barbs are effective, when the plate 30 is pressed or formed onto the backside of a panel, to fasten the plate to the panel by substantial gripping action. Two of the parallel edges 36 of the plate 30 are upwardly inturned to form parallel longitudinal edge channels 38. A lateral tip hole 40 is formed near the upper end (FIG. 4) of each edge channel 38. At the lower end of each channel, the tip of each edge 36 is bent inward to form a tab 42.

Referring back to FIG. 3, the mounting bracket 4 is shown in snap-fit engagement with the base plate 30. The legs and feet of bracket 4 are resiliently pressed together and the tips 16 and feet 6 of the bracket placed respectively in the tip holes 40 and edge channels 38 of the base plate. The heel portion 7 of each foot 6 abuts against a tab 42 to help lock the feet 6 in place within the edge channels.

The fastener 18, mounted on the mounting bracket 4, is only one example among several types of fastener elements that might be mounted upon bracket 4. In addition to the fastener 18 as shown, there are numerous other types; and it is contemplated that the mounting bracket of this invention should accomodate such others.

The mounting bracket 4 provides the base upon which the fastener 18 stands. The space between the plane of the bracket feet 6 and the yoke 10 is roughly the stand-off spacing provided by the bracket. A wide range of stand-off spacings, to accommodate the varying contours of the panels and structures between which they are mounted, is provided by using mounting brackets of various heights, i.e. leg dimensions. The bracket lends itself to production of such a variety of sizes because it is formed or bent from wire which is relatively easy to work.

Another feature of mounting bracket 4 adding to its versatility is that the plane of the yoke 10 may or may not be parallel with the plane of the feet 6. The bracket can easily be formed so that the plane of the yoke is inclined relative to that of the feet for mounting between a support structure and panel which are not parallel. The legs 8 can be of equal length as shown, and the plane of the yoke 10 can be inclined at other than 90° from legs 8. Also, legs 8 might be of uneven length so that the plane of yoke 10 is inclined toward one of the legs.

FIGS. 6 and 7 show another form of mounting bracket, bracket 50 including feet 6 and tips 16 like bracket 4. The rest of bracket 50 is formed of legs 52 extending outwardly from the plane of the feet 6, joining at a yoke 54. Bracket 50 in this form can spring clip with a support structure or an adjacent panel, by means of its curved shape, as shown in FIG. 7. Bracket 50 may also be made of spring steel to add resilience and strength to its clipping action.

FIGS. 8-11 show perspective, top, and sectional views of another form of base plate 60. Base plate 60 is a substantially flat plate of a plastic material having a plurality of stipples or raised points 62 on its underside to provide as many point contacts for joining or sonic welding of the base plate 60 onto the back side of a panel (these raised points 62 on the underside appear as dimples or recesses 64 in the top side as suggested in FIG. 9). Two of the parallel edges 66 of the plate 60 are upwardly inturned to form parallel longitudinal edge channels 68. A lateral tip hole 70 is formed near the upper end (FIG. 9) of each edge channel 68. The edges 66 are inturned slightly more at the lower end (FIG. 11) than at the upper end (FIG. 10). The forward or tip portion of a foot of a mating mounting bracket 4 will thus slip into place within the edge channel 68; the rearward or heel portion will more tightly snap into place within th edge channel 68 for a firm rattle-free engagement of the heel of the bracket within the edge channels.

I claim:

1. A fastener system for attachment between a supporting structure and a supported panel member, said fastener system including:
    a. a base plate for attachment to the backside of said panel member;
    b. a resilient mounting bracket, said mounting bracket having:
        (1) a pair of generally parallel feet adapted for connection with said base plate, each of said feet terminating at a tip that is angled away from said foot, said tips adapted for snap engagement with said base plate,
        (2) a pair of generally parallel legs, one extending upward from each of said feet, and
        (3) a yoke joining said legs and extending in a generally transverse plane over said feet, said yoke defining a collar intermediate said legs and spaced from said base; and
    c. a fastener mounted on said mounting bracket, said fastener including a flanged neck portion for snap engagement within said collar and an upwardly extending body portion for engagement with said supporting structure.

2. A fastener system as defined in claim 1 in which said bracket is formed of wire.

3. A fastener system as defined in claim 1 in which said base plate includes upturned rolled edges defining parallel edge channels, said edge channels each having a tip hole near one end thereof, said feet and tips respectively mating with said channels and tip holes.

4. A fastener system as defined in claim 3 in which said base plate further includes end tabs at the ends of said edge channels opposite said tip holes for locking engagement with the heel portions of said feet.

5. A fastener system as defined in claim 3 in which said parallel edge channels are tapered so that the fit of said feet into said channels is tighter toward the heel portion than toward the tip portion of said feet.

6. A fastener system as defined in claim 3 in which said base plate is of a plastic material and includes a plurality of raised points on its underside for joining of said base plate to said panel member.

7. A fastener system as defined in claim 6 in which said parallel edge channels are tapered so that the fit of said feet into said channels is tighter toward the heel portion than toward the tip portion of said feet.

8. A fastener system for attachment between a supporting structure and a supported panel member, said fastener system including:
    a. a fastener adapted for insertion and attachment within an aperture defined by said supporting structure;
    b. a mounting bracket to mount said fastener and to bridge a space between said fastener and said panel member, said mounting bracket being formed of resilient wire and having a pair of generally parallel feet terminating in angled tips at a toe region of said feet opposite a heel region of said feet, a pair of generally parallel legs, one extending upward from said heel region of each of said feet, and a yoke joining said legs and extending in a plane spaced over said feet, said yoke defining a collar into which said fastener is spring mounted; and
    c. a base plate for attachment to the backside of said panel member, said base plate including upturned rolled edges defining parallel edge channels, said edge channels each having a tip hole near one end thereof, and said feet and said tips respectively interlocking with said channels and tip holes.

9. A fastener system as defined in claim 8 in which said base plate further includes end tabs at the ends of said edge channels opposite said tip holes for locking engagement with said heel regions of said feet.

10. A fastener system as defined in claim 8 in which said parallel edge channels are tapered so that the fit of said feet into said channels is tighter toward said heel region than toward said toe region of said feet.

11. A fastener system as defined in claim 8 in which said base plate is of a plastic material and includes a plurality of raised points on its underside for joining of said base plate to said panel member.

12. A fastener system as defined in claim 11 in which said parallel edge channels are tapered so that the fit of said feet into said channels is tighter toward said heel region than toward said toe region of said feet.

13. A fastener system for use between a supporting structure and a supported panel member, said fastener system including a mounting bracket and a base plate for attachment to the backside of said panel member, and said fastener system comprising:
   a. said mounting bracket being formed of wire and having a pair of generally parallel feet adapted for connection with said base plate, each of said feet having a toe region terminating at a tip which is angled from said foot;
   b. said base plate including upturned rolled edges defining parallel edge channels, said edge channels each having a tip hole near one end thereof, and said feet and said tips respectively interlocking with said channels and with said tip holes in said channels;
   c. a pair of generally parallel legs, one extending upward from a heel region of each of said feet opposite said toe regions of said feet; and
   d. a yoke joining said legs and extending in a generally transverse plane over said feet, said yoke defining a collar intermediate said legs, said mounting bracket being resilient to enable said feet and tips to be sprung into said engagement with said base plate and to dispose said collar for spring engagement with a mating fastener element.

14. A fastener system as defined in claim 13 in which said parallel edge channels are tapered so that the fit of said feet into said channels is tighter toward said heel regions than toward said toe regions of said feet.

15. A fastener system as defined in claim 13 in which said base plate is of a plastic material and includes a plurality of raised points on its underside for joining of said base plate to said panel member.

16. A fastener system as defined in claim 15 in which said parallel edge channels are tapered so that the fit of said feet into said channels is tighter toward said heel regions than toward said toe regions of said feet.

17. A fastener system as defined in claim 13 in which said base plate further includes end tabs at the ends of said edge channels opposite said tip holes for locking engagement with said heel regions of said feet.

18. An automotive panel fastener system comprising:
   a. a base plate attached to and lying in the plane of a back surface of said panel, said base plate having edges turned inward from said panel surface;
   b. a wire support attached to said base plate;
   c. said support having a pair of parallel feet running along and retained within said inturned edges of said base plate;
   d. toe regions of said feet having end tips angled from said feet and extending through and interlocked with tip holes formed in a toe end region of said inturned edges of said base plate; and
   e. legs of said support extending from heel regions of said feet at a heel end region of said base plate opposite said to end region, said legs being joined by a yoke disposed for mounting said panel in place.

19. A fastener system as defined in claim 18 in which said base plate includes barbs on its underside for gripping engagement with the backside of said panel.

20. A fastener system as defined in claim 18 in which said legs are of unequal length so that the plane of said yoke is non-parallel with the plane of said feet.

21. A fastener system for holding an internal automotive panel in place within an automotive body, said fastener system comprising:
   a. a variety of supports, each formed of wire to have a pair of legs joined by a yoke and a pair of parallel feet, heel regions of which are joined respectively to said pair of legs;
   b. a base plate usable with any of said wire supports, said base plate being secured flat against a back surface of said panel and being shaped with inturned lateral edges for receiving and retaining said feet of said wire supports; and
   c. said inturned lateral edges at a toe end region of said base plate having tip holes, toe regions of said feet having tips angled from said feet to extend through said holes in said inturned lateral edges of said base plate, and said heel regions of said feet being disposed at a heel end region of said base plate opposite said toe end region of said base plate so that said legs clear said heel end region of said base plate.

22. A fastener system as defined in claim 21 in which said base plate includes barbs on its underside for gripping engagement with the backside of said panel.

23. A fastener system as defined in claim 21 including a fastener attached to said yoke for connecting said panel and said fastener system to said automotive body.

* * * * *